United States Patent
Jacob et al.

(10) Patent No.: US 8,228,335 B1
(45) Date of Patent: Jul. 24, 2012

(54) SNAPSHEET ANIMATION VISUALIZATION

(75) Inventors: Oren Jacob, Piedmont, CA (US);
Warren Trezevant, Oakland, CA (US);
Robert Jensen, Berkeley, CA (US)

(73) Assignee: Pixar, Emeryville, CA (US)

( * ) Notice: Subject to any disclaimer, the term of this patent is extended or adjusted under 35 U.S.C. 154(b) by 820 days.

(21) Appl. No.: 12/323,957

(22) Filed: Nov. 26, 2008

(51) Int. Cl.
*G06T 13/00* (2011.01)
(52) U.S. Cl. ........................ 345/473; 345/419
(58) Field of Classification Search .................. 345/473, 345/419
See application file for complete search history.

(56) References Cited

U.S. PATENT DOCUMENTS 6,215,495 B1 * 4/2001 Grantham et al. ............ 345/419

FOREIGN PATENT DOCUMENTS

EP 1918881 A2 * 5/2008

* cited by examiner

*Primary Examiner* — Maurice L McDowell, Jr.
(74) *Attorney, Agent, or Firm* — Patterson & Sheridan, LLP

(57) ABSTRACT

To assist users in identifying the contributions of specific computer graphics variable or animation variable knots to the timing, rhythm, and expression of complicated animations, an animation software interface includes a snapsheet mode for visualizing and authored poses of objects. The snapsheet mode presents a series of rendered still images corresponding with the authored poses of one or more selected entities. The snapsheet mode may use one or more computer graphics variables, one or more objects, or arbitrary frames or shot time values as selected entities. The snapsheet mode associates each still image with a portion of the shot time of the overall animation corresponding with the selected entity's influence in the animation. Users may modify animation data via the snapsheet mode using each image may act as a proxy for manipulating associated authored values of one or more computer graphics variables.

25 Claims, 6 Drawing Sheets

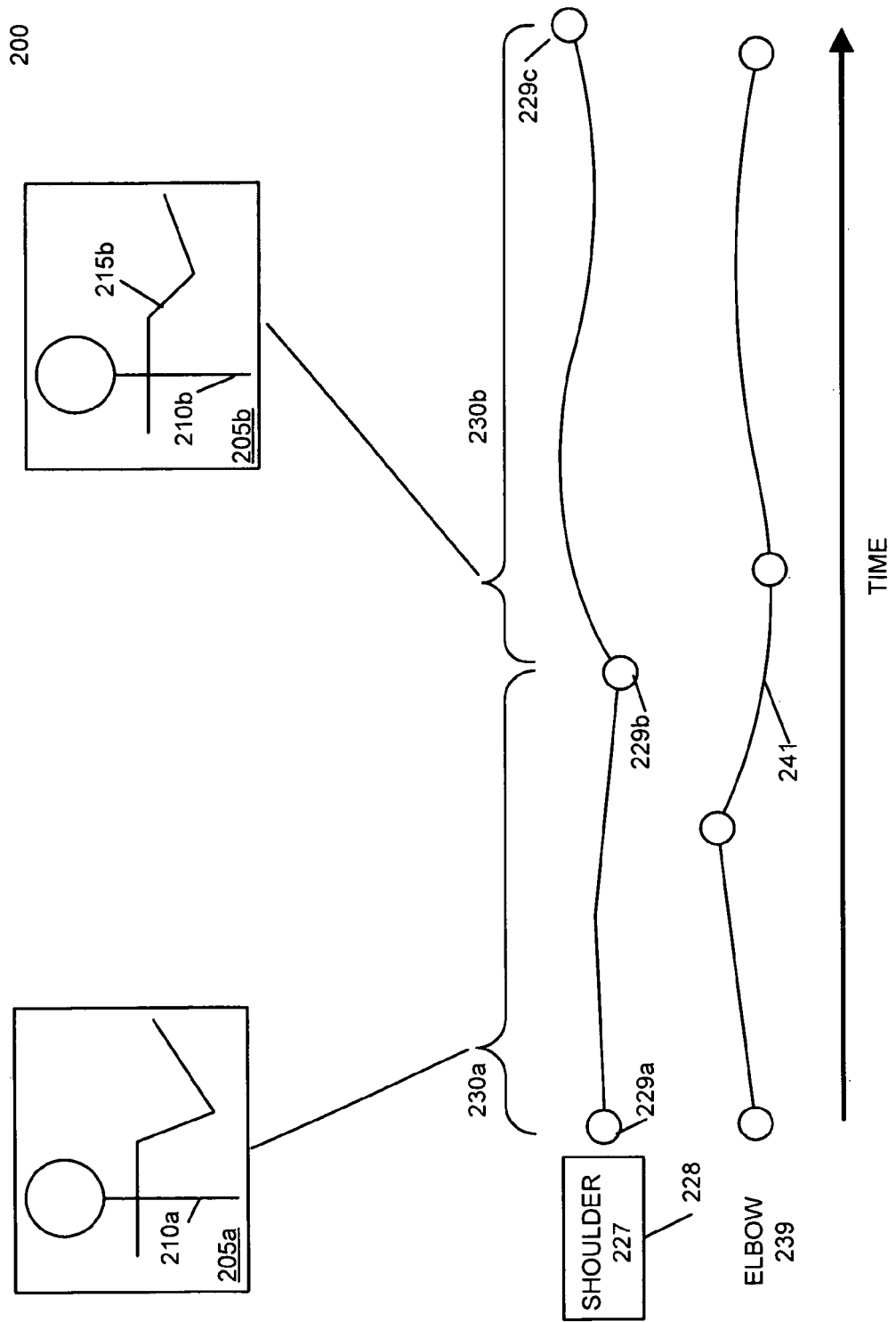

SNAPSHEET ANIMATION VISUALIZATION

BACKGROUND

The present invention relates to the field of computer graphics, and in particular to methods and apparatus for creating, modifying, and visualizing animation data. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, an object's appearance is defined by a three-dimensional computer model. To appear realistic, the computer model of an object is often extremely complex, having millions of surfaces and tens of thousands of attributes. Due to the complexity involved with animating such complex models, particularly character models with hundreds or thousands of degrees of freedom, animation tools often rely on computer graphics variables and associated computer graphics variable functions to define the attributes of objects. Examples of computer graphics variables include animation variables, shader relationships, weighting relationships, and mappings of influence between computer graphics components. Computer graphics variable functions associate input values to a corresponding output values according to some rule or mathematical expression. Computer graphics variable functions may be functions of an input time variable or any other type of input.

For example, animation variables, which are sometimes referred to as avars, are parameters used by functions to modify the position, or pose, of all or a portion of a model. Animation variables and their associated functions can specify relatively simple motions, such as the translation and rotation of objects. Animation variables and their associated functions are also used to abstract complicated modifications to a model to a relatively simple control. For example, animation variables can specify the rotation angles of the joints of a character model, thereby positioning the character model's limbs and appendages. More complicated animation variables can define the degree of opening of a character's mouth. In this example, the value of a single animation variable is provided to one or more computer graphics variable functions to determine the positions of many different parts of the character model needed to open the characters mouth to the desired degree. In this example, animation software tools then modify the character model according to the outputs of the computer graphics variable functions to produce a character model posed with an open mouth.

Users define computer graphics images and animated sequences by specifying the values of computer graphics variables of an object, and hence the pose of an object, at one or more key frames. A pair of a computer graphics variable value and its associated input value, such as a time value, is referred to as a knot. A set of one or more knots at a given input value defined by a user or another application, such as an inverse kinematic system, is referred to as an authored pose of an object.

Based on the authored poses of one or more objects, an animation system determines the poses of object for frames, time values, or any other type of input values where authored poses are not defined. Typically, animation systems interpolate the values of its computer graphics variables from the knots of authored knots. A variety of different interpolation schemes are used in animation, including linear, cubic, b-spline, Bezier, and Catmull-Rom. Typically, animation tools will display a line or curve, such as a spline curve, defined by one or more knots of a computer graphics variable and the interpolation scheme.

Precise control of the timing, rhythm, values, and interpolation of computer graphics variable knots is essential to achieving artistically effective animation. Subtle adjustments in the value, timing, and interpolation of knots can greatly change the artistic impact of animation. During animation, many gestures or actions are comprised of large numbers of knots from one or more computer graphics variables acting in concert to achieve the desired motion. For example, a sequence of knots of a single computer graphics variable might define how a character's mouth opens during a sequence of dialog. In another example, a sequence of knots for multiple computer graphics variables might define a character's arm and hand movements while waving or pointing.

Because animation is often defined by large numbers of related computer graphics variable knots, it is often difficult for users to identify the visual and aesthetic contribution of specific computer graphics variable knots to complicated animations. In particular, the timing and rhythm of specific computer graphics variable knots are difficult to discern within complicated animations.

SUMMARY

To assist users in identifying the contributions of specific computer graphics variable or animation variable knots to the timing, rhythm, and expression of complicated animations, an embodiment of an animation software interface includes a snapsheet mode for visualizing and optionally modifying authored poses of objects. The snapsheet mode presents a series of rendered still images corresponding with the authored poses of one or more selected entities. The snapsheet mode may use one or more computer graphics variables, one or more objects, or arbitrary frames or shot time values as selected entities. In an embodiment, the snapsheet mode associates each still image with a portion of the shot time of the overall animation corresponding with the selected entity's influence in the animation. For example, a still image may be associated with the shot time from a first knot of a selected animation variable up to the shot time of an adjacent following knot of the selected animation variable.

In a further embodiment, users may modify animation data via the snapsheet mode. For example, each image may act as a proxy for manipulating one or more authored values of one or more animation variables associated with the image. Users may move knots forwards or backwards in shot time by manipulating associated images, allowing users to modify the timing or rhythm of animation. In another example, a user can provide a command to move the knots associated with an image to a new shot time. In still another example, user may move knots preceding or following an image to the current shot time.

BRIEF DESCRIPTION OF THE DRAWINGS

The invention will be described with reference to the drawings, in which:

FIGS. 2A and 2B illustrate example operations of an animation software interface according to an embodiment of the invention;

DETAILED DESCRIPTION

Figure 1:
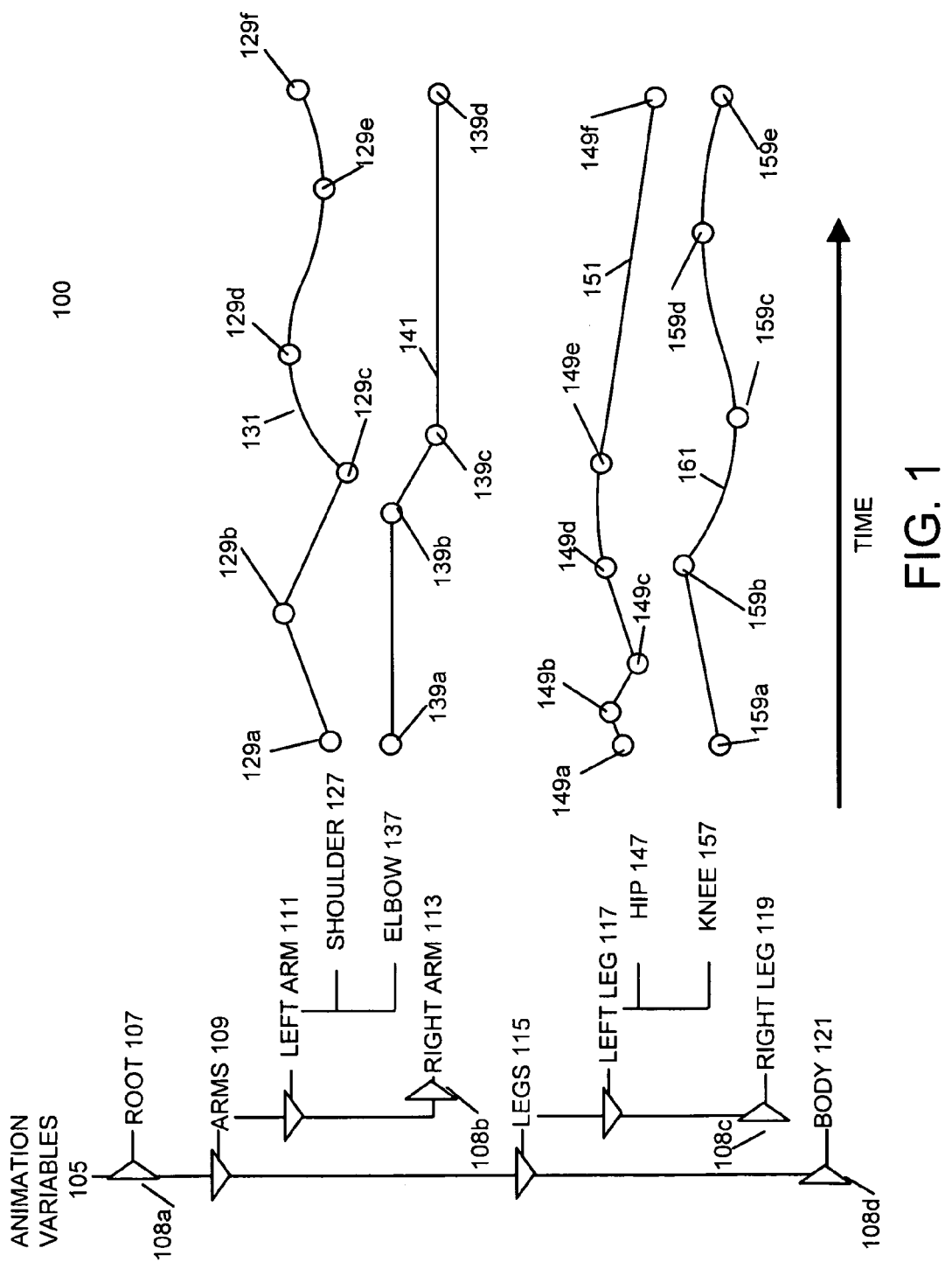
FIG. 1 illustrates an example animation software interface suitable for use with an embodiment of the invention.

FIG. 1 illustrates an example animation software interface 100 according to an embodiment of the invention. Animation software interface 100 presents a set of animation variables 105. In an embodiment, the animation software interface 100 arranges the set of animation variables 105 into groups and/or according to a hierarchy to assist users in finding and manipulating animation variables 105. Example animation software interface 100 includes a root group 107, an arms group 109, a legs group 115, and a body group 121. Groups may include one or more animation variables and/or one or more subgroups. In example animation software interface 100, arms group 109 includes left arm group 111 and right arm group 113. Legs group 115 includes left leg group 117 and right leg group 119. In an embodiment, groups may be expanded to reveal their sub-groups and/or animation variables or collapsed to hide their sub-groups and/or animation variables. Example animation software interface 100 includes expansion controls 108, including expansion controls 108a, 108b, 108c, and 108d, for expanding or collapsing groups.

Example animation software interface 100 includes shoulder animation variable 127, elbow animation variable 137, hip animation variable 147, and knee animation variable 157. In this example, animation variables 105 including shoulder animation variable 127, elbow animation variable 137, hip animation variable 147, and knee animation variable 157 parameterized according to shot time input values.

Each of the animation variables 105 is associated with one or more knots or control points. Each knot specifies a value of the animation variable for a shot time input value. Animation variable knots may be specified by users or by other applications, such as inverse kinematics systems. In general, a knot of a computer graphics variable such as an animation variable is referred to as an authored value of the computer graphics variable, because it is specified explicitly by a user or an application. A set of knots defined for a set of animation variables of an object at a specific time input value is referred to as the authored pose of the object at that shot time input value.

Animation and computer graphics software applications determine the values of computer graphics variables at input values without defined knots using interpolation or other techniques. For example, an animation software application may interpolate between two or more knots of an animation variable to determine the value of the animation variable for frames or other shot time input values between the knots of the animation variable. Embodiments of animation software applications may use a variety of interpolation schemes, including linear, cubic, b-spline, Bezier, and Catmull-Rom techniques. In general, the values of computer graphics variables that are not specified by knots are referred to as the generated values of the computer graphics variable.

Example animation software interface 100 displays the authored and generated values of animation variables. In an embodiment, animation software interface 100 displays the authored values of animation variables as highlighted points and the generated values of animation variables as lines or curves, such as a spline curve. For example, animation software interface displays the authored values of shoulder animation variable 127 as points 129a, 129b, 129c, 129d, 129e, and 129f. Animation software interface 100 displays the generated values of shoulder animation variable 127 as curve 131. Similarly, animation software interface 100 displays the authored values of elbow animation variable 137 as points 139a, 139b, 139c, and 139d and its generated values as curve 141. Animation software interface 100 displays the authored values of hip animation variable 147 as points 149a, 149b, 149c, 149d, 149e, and 149f and its generated values as curve 151. Animation software interface 100 displays the authored values of knee animation variable 157 as points 159a, 159b, 159c, 159d, and 159e and its generated values as curve 161.

The groups and animation variables shown in example animation software interface 100 are intended to illustrate one application of embodiments of the invention. However, embodiments of example animation software interface may include any arbitrary number and types of computer graphics variables arranged with or without groups or hierarchies.

Additionally, in example animation software interface 100, the animation variables 127, 137, 147, and 149 are expressed as functions of input shot time values. However, embodiments of example animation software interface 100 are also applicable to any type of computer graphics variable parameterized by inputs other than time.

For example, a single input computer graphics variable may be used to represent a complex behavior or transformation, such as the deformation of a character model's face when opening its mouth. In this example, multiple deformation functions may be required to produce the desired result. For each of these deformation functions, a weighting or influence computer graphics variable specifies the weight or influence of its associated deformer function based on the value of the input computer graphics variable. In this example, each deformation function can have its own weighting or influence computer graphics variable. These weighting or influence computer graphics variables are parameterized by the input computer graphics variable, rather than by shot time.

To assist users in identifying the contributions of specific computer graphics variable or animation variable knots to the timing, rhythm, and expression of complicated animations, an embodiment of an animation software interface includes a snapsheet mode for visualizing and optionally modifying authored poses of objects. The snapsheet mode presents a series of rendered still images corresponding with the authored poses of one or more selected entities. The snapsheet mode may use one or more computer graphics variables, one or more objects, or arbitrary frames or shot time values as selected entities. In an embodiment, the snapsheet mode associates each still image with a portion of the shot time of the overall animation corresponding with the selected entity's influence in the animation. For example, a still image may be associated with the shot time from a first knot of a selected animation variable up to the shot time of an adjacent following knot of the selected animation variable.

Figure 2B:
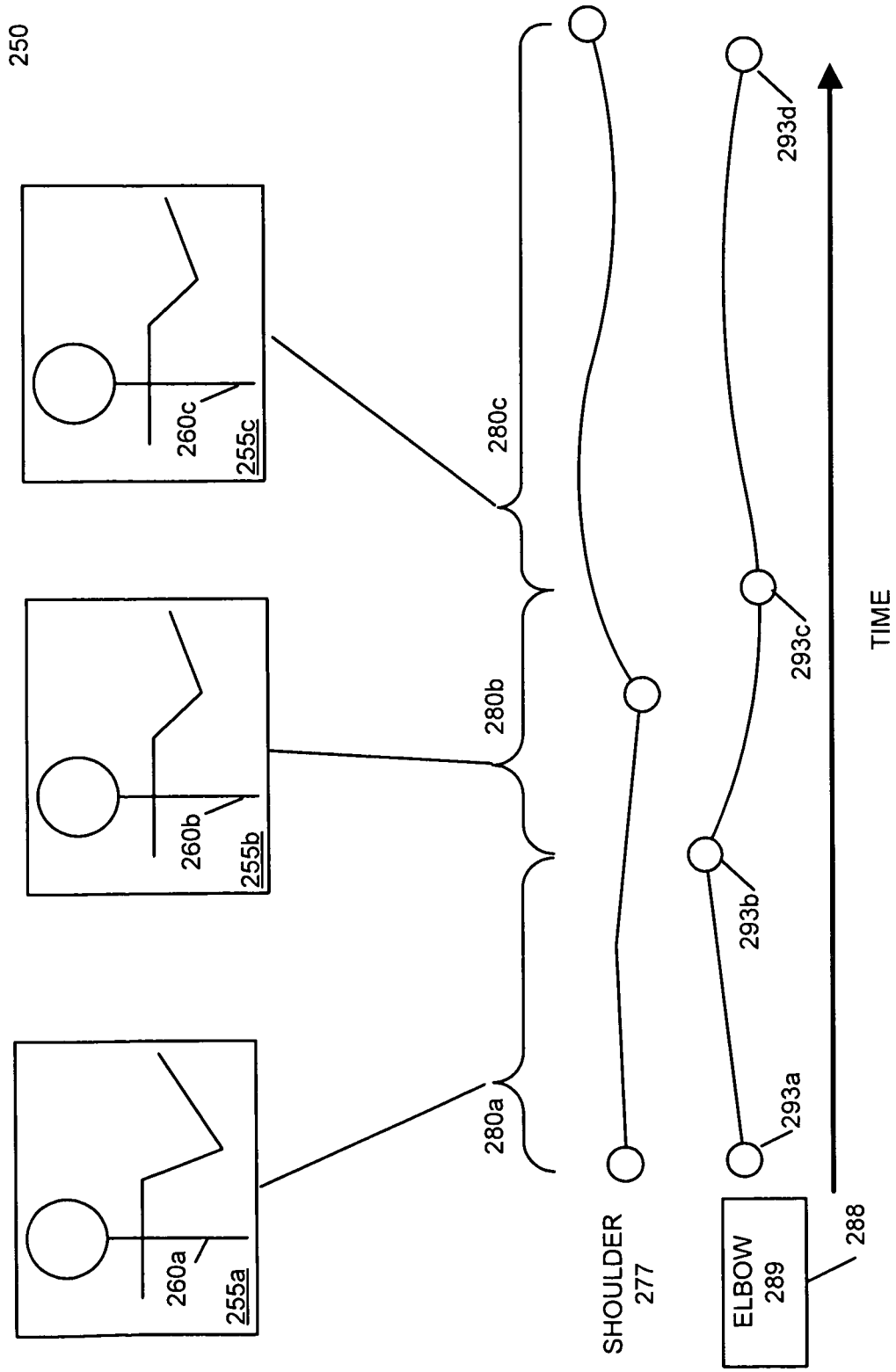

FIGS. 2A and 2B illustrate example operations of an animation software interface according to an embodiment of the invention. FIG. 2A illustrates a first example operation 200 of an animation software interface according to an embodiment of the invention. The first example operation 200 illustrates the snapsheet mode of an animation software interface in response to the selection of a first animation variable. First example operation 200 can be used to visualize and/or modify the animation of a character model 210; however, embodiments of the snapsheet mode may be applied to any type and number of objects.

FIG. 2A includes shoulder and elbow animation variables 227 and 239, which have values defining at least part of an animation of character model 210. In this example, the shoulder animation variable 227 is selected for visualization using the snapsheet mode. Conversely, elbow animation variable 237 is not selected for inclusion in the snapsheet animation visualization in this example. Embodiments of animation software interfaces may or may not display animation variables and their values while the snapsheet mode is active.

In an embodiment, the pose of a character model 210 is determined by the values of its animation variables. While the snapsheet mode is active, the animation software interface replaces the animation of all or a portion of the scene including the selected entity with still images. In an embodiment, each still image is associated with an authored value of a selected entity, such as a knot of an animation variable. In a further embodiment, each still image is displayed for a portion of the shot animation time associated with the selected entity, such as from the shot time of a knot of an animation variable to the shot time of the next adjacent knot.

For example, when shoulder animation variable 227 is the selected entity 228, a first still image 205a including the character model in a first pose 210a is associated with the interval of shot time 230a from knot 229a to knot 229b. Similarly, a second still image 205b including the character model in a second pose 210b is associated with the interval of shot time 230b from knot 229b to knot 229c. In this example, the values of elbow animation variable 239 and any other animation variables or other types of computer graphics variables are still used to change the poses of the character model; however, these changes are only shown in still images 205, which are associated with knots of the selected shoulder animation variable 227.

The number of images associated with animation data and their associated shot time intervals may vary depending upon the selected entity. FIG. 2B illustrates a second example operation 250 of an animation software interface according to an embodiment of the invention. Like example 200, the second example operation 250 illustrates the snapsheet mode of the animation software interface in response to the selection of a second animation variable.

FIG. 2B includes shoulder and elbow animation variables 277 and 289, which have values defining at least part of an animation of character model 260. Animation variables 277 and 289 have the same values as animation variables 227 and 239 in example 200.

In example 250, the elbow animation variable 289 is selected for visualization using the snapsheet mode. Conversely, shoulder animation variable 277 is not selected for inclusion in the snapsheet animation visualization in this example. Embodiments of animation software interfaces may or may not display animation variables and their values while the snapsheet mode is active.

In an embodiment, the pose of a character model 260 is determined by the values of its animation variables. For example, when elbow animation variable 289 is the selected entity 288, a first still image 255a including the character model in a first pose 260a is associated with the interval of shot time 280a from knot 293a to knot 293b. Similarly, a second still image 255b including the character model in a second pose 260b is associated with the interval of shot time 280b from knot 293b to knot 293c. A third still image 255c including the character model in a third pose 260c is associated with the interval of shot time 280c from knot 293c to knot 293d.

Although examples 200 and 250 are based on the same animation data, the images from the snapsheet mode are different because of the difference in selected entities. The images resulting from the snapsheet mode may be presented to a user to emphasize the timing and rhythm of animation data associated with the selected entity. Users may select one or more animation variables or other computer graphics variables as the selected entities to control the presentation of images by the snapsheet mode. In a further embodiment, users may select specific frames or shot times instead of or in addition to the computer graphics variables as selected entities. In the case of a selected frame or shot time as a selected entity, the snapsheet mode will render an image of the scene at the selected frame or shot time regardless of the timing of any knots or authored values.

Figure 3A:
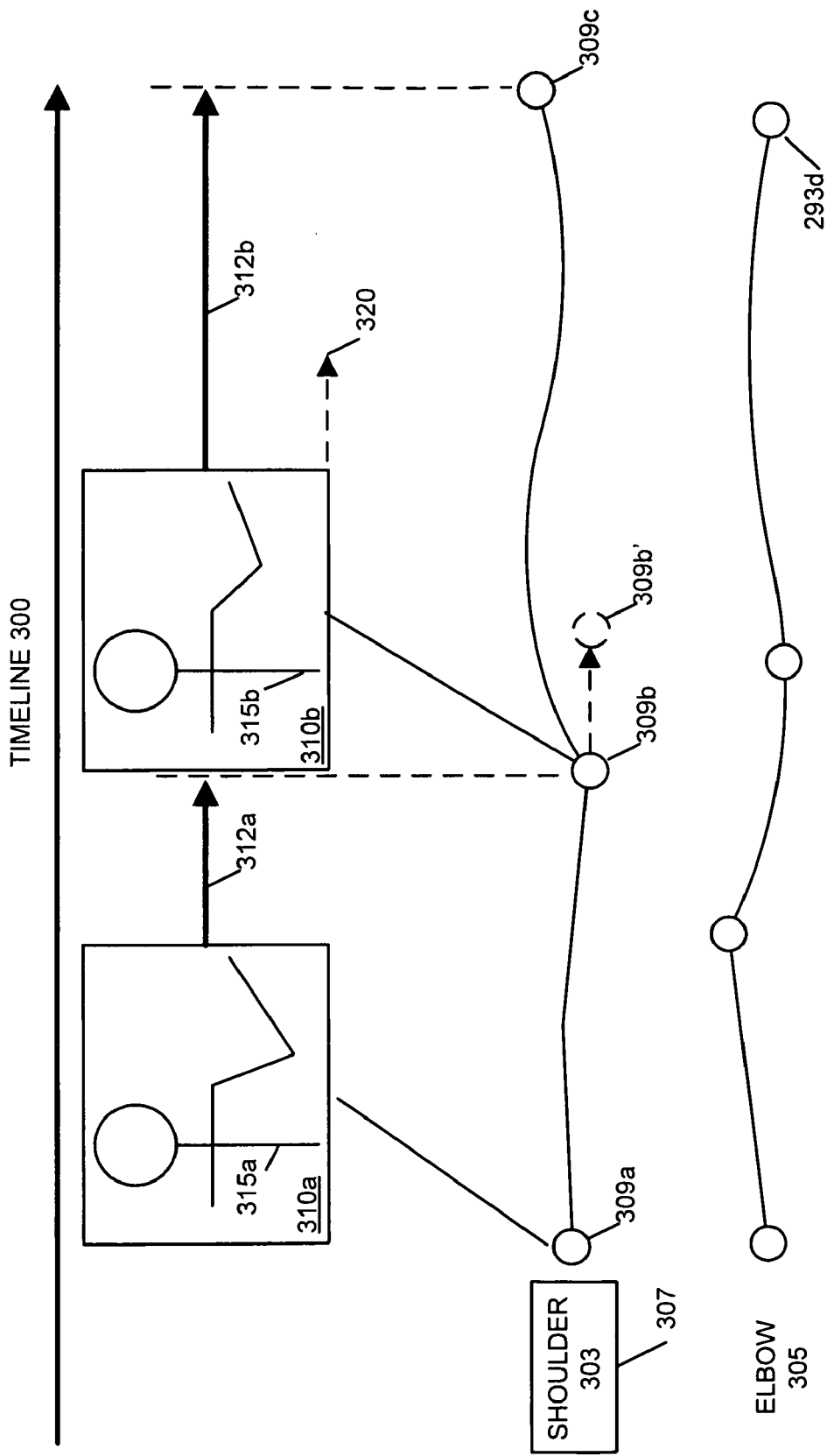
FIGS. 3A and 3B illustrate example editing operations using animation software interfaces according to embodiments of the invention.

Images associated with intervals of shot time by the snapsheet mode, such as images 205 and 255, can be presented to users in a number of ways. In one embodiment, a timeline including all or a portion of the images may be displayed in conjunction with a graphical representation of the intervals of shot time associated with the images. FIG. 3A illustrates an example timeline 300 according to this embodiment. Example timeline 300 includes images 310 showing poses 315 of a model based on at least animation variables 303 and 305.

In this example 300, shoulder animation variable 303 is the selected entity 307; thus, the number and shot time intervals of images produced by the snapsheet mode of the animation software interface will be based on the authored values or knots 309 of shoulder animation variable 303.

Timeline 300 includes image 310a showing a model in pose 315a based at least in part on the value of knot 309a of animation variable 303. A visual indicator 312a shows the shot time interval associated with image 310a, which corresponds with the shot time between knots 309a and 309b. Similarly, timeline 300 includes image 310b showing a model in pose 315b based at least in part on the value of knot 309b of animation variable 303. A visual indicator 312b shows the shot time interval associated with image 310b, which corresponds with the shot time between knots 309b and 309c.

In a further embodiment, users may modify animation data via the snapsheet mode. For example, if a user moves image 310b from its position on the timeline 300 to a new position 320, an embodiment of the animation software interface moves any animation variable knots associated with the image 310b, such as knot 309b, to a new position corresponding with the new position 320, for example forming a modified knot 309b'. In this example, each of the images 310 acts as a proxy for manipulating one or more authored values of one or more animation variables that are selected entities. Users may move knots forwards or backwards in shot time by manipulating associated images, allowing users to modify the timing or rhythm of animation.

In another example, a user can provide a command to move any animation variable knots, such as knot 309b, to a new shot time, for example forming a modified knot 359b'. Users may move knots forwards or backwards in shot time by manipulating associated images, allowing users to modify the timing or rhythm of animation. In response to the user command, an embodiment of the animation software interface modifies the position of associated image 360 on the timeline 300.

In an embodiment, images or other user interface elements in the snapsheet mode are associated with their corresponding authored data values via an active bidirectional association. The active bidirectional association allows modifications in the snapsheet mode to modify the authored data. Similarly, the active bidirectional association allows modifications in the authored data to modify the presentation of images in the snapsheet mode. Active bidirectional associations can be implemented using any technique known in the art, including application programming interfaces; event and message handling systems; and inter-application and/or intra-application communication techniques. The active bidirectional association may identify images and authored data using specific identifiers or general attributes, such as the shot time value or other input parameter values of the images or authored data values.

Figure 3B:
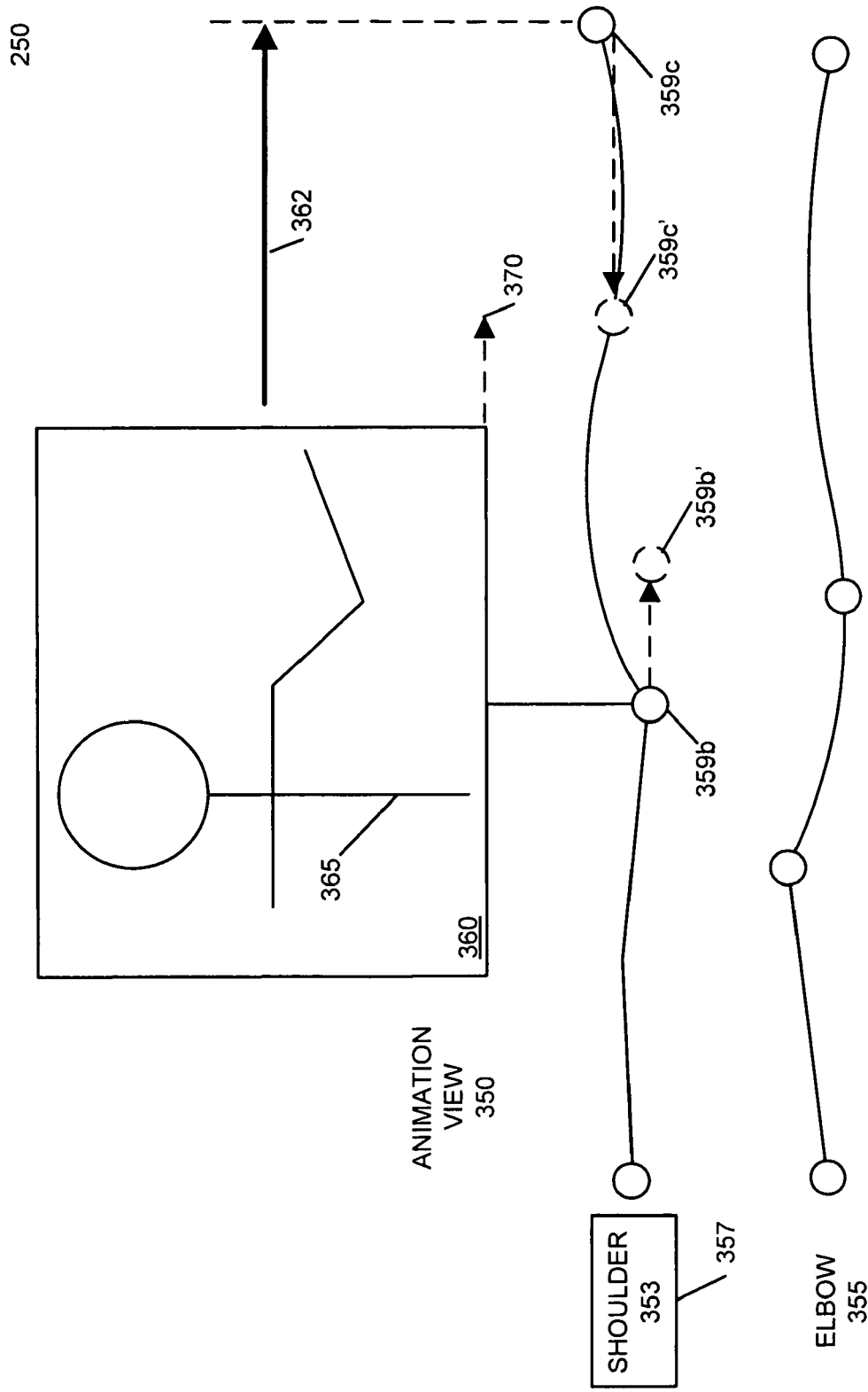

In another embodiment, an animation including all or a portion of the images may be displayed, with the each image displayed for a time period proportional to its associated shot time interval. FIG. 3B illustrates an example animation view 350 according to this embodiment. Example animation view 350 presents a sequence of images, such as the images 205 shown in FIG. 2A, as an animation showing a pose 365 of a model based on at least animation variables 353 and 355.

In this example 350, shoulder animation variable 353 is the selected entity 357; thus, the number and shot time intervals of images produced by the snapsheet mode of the animation software interface will be based on the authored values or knots 359 of shoulder animation variable 353.

Animation view 350 includes image 360 showing a model in pose 365 based at least in part on the value of knot 359a of animation variable 353. In an embodiment, image 360 will be displayed for a time period proportional to the shot time between knots 359b and 359c.

In a further embodiment, a user may interactively change the playback of the images in animation view 300, for example including pausing the playback; skipping, advancing, or reversing to a specific shot time or frame or to a relative shot time or frame offset from the current shot time; increasing or decreasing the playback speed; and/or skipping to an adjacent preceding or following image, which is associated with an adjacent knot of a selected entity.

In a further embodiment, users may modify animation data via the snapsheet mode. For example, a user can provide a command to move the knots associated with image 360 to a new shot time. In response to the user command, an embodiment of the animation software interface moves any animation variable knots associated with the image 360, such as knot 359b, to a new shot time, for example forming a modified knot 359b'. Users may move knots forwards or backwards in shot time by manipulating associated images, allowing users to modify the timing or rhythm of animation.

In a further embodiment, a user may move preceding or following knots to the current shot time. For example, if during playback of the sequence of images, the current shot time is time 370, a user may direct the animation software interface to move knots associated with the following image, such as knot 359c, to shot time 370, creating modified knot 359c'.

The animation variables and their knots are shown in the examples of FIGS. 3A and 3B for purposes of illustration. However, embodiments of the invention may include or omit the display of all or any portion of the animation variables from the animation software interface while the snapsheet mode is active. Alternate embodiments of the invention can include the display of all or any portion of the animation variables from the animation software interface while the snapsheet mode is active.

Figure 4:
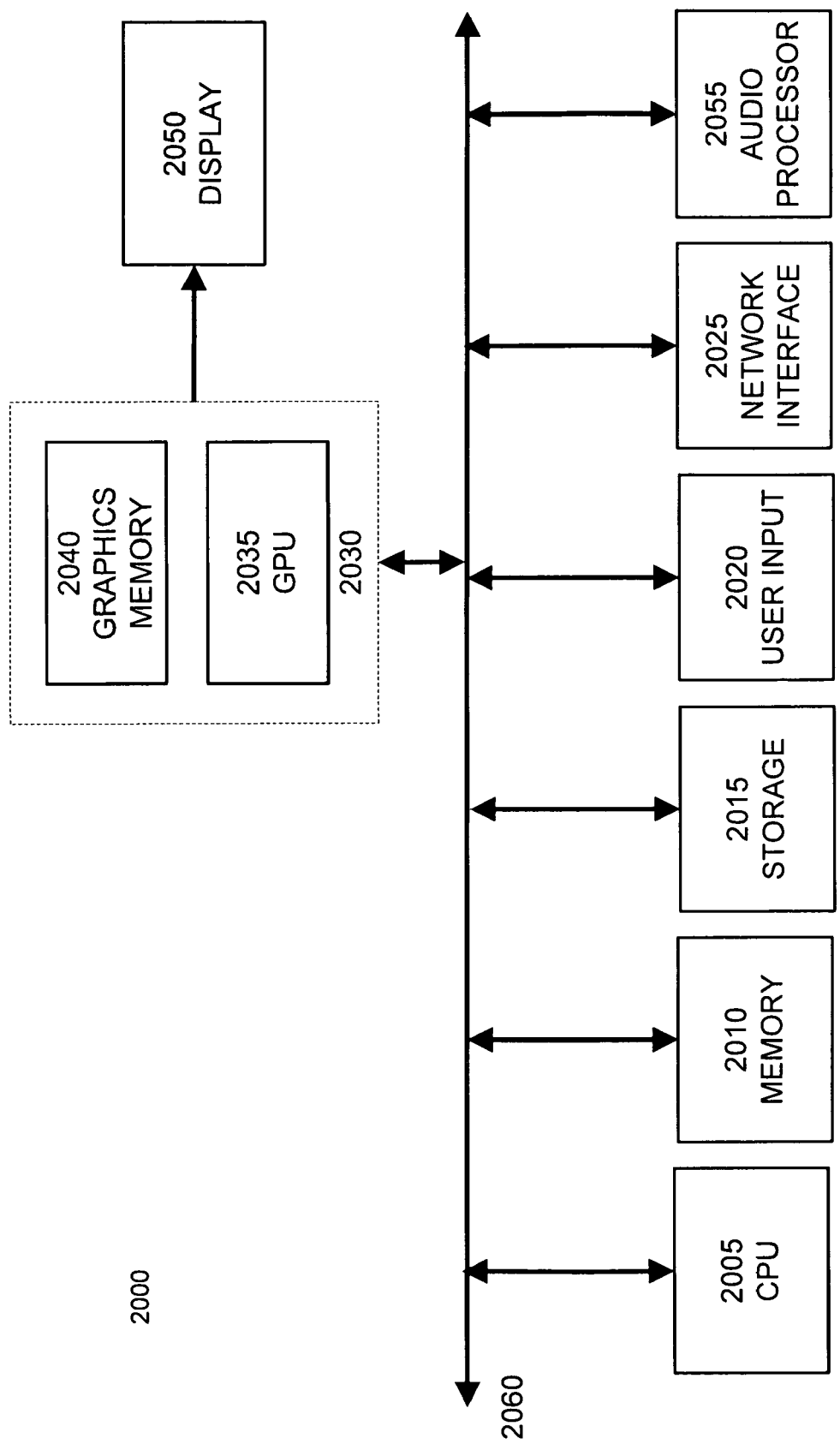
FIG. 4 illustrates a computer system suitable for implementing an embodiment of the invention.

FIG. 4 illustrates a computer system 2000 suitable for implementing an embodiment of the invention. FIG. 4 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include non-transitory computer-readable storage media such as fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Embodiments of the invention may render images for the snapsheet mode using any rendering technique known in the art. In an embodiment, an image of a scene is rendered for each authored value or knot of each selected entity as well as for any specific frames or shot times selected by the user. Embodiments of the animation software application may include an internal renderer and/or be adapted to interface with external renderer applications to generating image and/or animations. An embodiment of the snapsheet mode then assembles the rendered images to create a presentation, such as a timeline or animation view. In this embodiment, if the user changes the timing of knots associated with an image, the presentation may be updated without re-rendering all or a portion of the object associated with the modified knots.

In a further embodiment, a background animation can be rendered separately from the objects selected for examination with the snapsheet mode. Each still image may be composited or blended with a corresponding portion of the background animation, so that the selected entity appears static while the background animation moves. Depth information for the still images and the background animation may be stored during rendering to enable this compositing to correctly occlude objects.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of visualizing animation in a computer graphics scene, the method comprising:
   receiving animation data for a computer graphics scene, wherein the animation data includes at least a first computer graphics variable defined with respect to an input variable, wherein the input variable is defined over a range of input variable values and wherein the first computer graphics variable includes authored values defined for at least a first subset of the range of input variable values, such that each of the authored values is associated with one of the input variable values within the first subset of the range of input variable values;
   generating rendered images for each of the first subset of the range of input variable values, wherein each rendered image includes an active bidirectional association with one of the authored values of the first computer graphics variable and with an input variable interval within the range of input variable values; and
   generating a presentation including the rendered images and a representation of the input variable intervals;
   wherein the animation data comprises a second computer graphics variable defined with respect to the input variable and including second authored values for a second subset of the range of input variable values different from the first subset of the range of input variable values; and
   wherein each rendered image includes at least a portion of the computer graphics scene poses according to the associated authored value of the first computer graphics variable and a value of the second computer graphics variable at the associated one of the first subset of the range of input variable values.

2. The method of claim 1, wherein:
   the input variable includes a time variable defined over at least a range of shot times values;
   the first subset of the range of input variable values includes a subset of the range of shot time values associated with the authored values; and
   the input variable intervals include shot time intervals at least partially within the range of shot time values.

3. The method of claim 2, wherein the presentation includes a timeline adapted to display at least a portion of the rendered images in association with graphical indicators of their respective shot time intervals.

4. The method of claim 3, wherein the timeline is adapted to display at least the portion of the rendered images according to the order of their respective associated shot time intervals.

5. The method of claim 2, wherein the presentation includes an animation view of at least a portion of the computer graphics scene, wherein the animation view is adapted to display each rendered image for a time duration proportional to its associated shot time interval.

6. The method of claim 5, wherein the presentation includes a user interface adapted to interactively control the playback of the animation view.

7. The method of claim 5, wherein the animation view is adapted to display a background animation composited with the rendered images.

8. The method of claim 1, wherein each of at least a portion of the input variable intervals is associated with a portion of the range of input variable values between adjacent authored values.

9. The method of claim 1, wherein the value of the second computer graphics variable at the associated one of the first subset of the range of input variable values is selected from a group consisting of:
   the second authored values and generated values based on the second authored values.

10. The method of claim 1, wherein receiving animation data for a computer graphics scene comprises:
    receiving a selection entity including the first computer graphics variable.

11. The method of claim 1, comprising:
    receiving a modification to the presentation, wherein the modification selects at least one of the rendered images;
    identifying the authored value of the first computer graphics variable associated with the selected rendered image; and
    modifying the authored value of the first computer graphics variable based on the modification to the presentation using the active bidirectional association.

12. The method of claim 11, wherein:
    the modification includes a modified input variable value associated with the selected rendered image; and
    modifying the authored value comprises changing the input variable value associated with the authored value to the modified input variable value using the active bidirectional association.

13. The method of claim 1, comprising:
receiving a modification to one of the authored values of the first computer graphics variable;
identifying the rendered image associated with the modified authored value using the active bidirectional association;
determining a modified input variable interval associated with the identified rendered image based on the modified authored value; and
modifying the presentation such that the representation includes the modified input variable interval.

14. The method of claim 13, wherein determining the modified input variable interval comprises:
selecting the input variable interval associated with the identified rendered image; and
setting a boundary of the selected input variable interval based on the modified authored value to determine the modified input variable interval.

15. The method of claim 1, wherein
the input variable includes a computer graphics variable defined over at least a range of computer graphics variable values; and
the authored values include weight values associated with the first subset of the range of input variable values.

16. A non-transitory computer-readable storage medium including instructions adapted to direct a computer to perform an operation, the operation comprising:
receiving animation data for a computer graphics scene, wherein the animation data includes at least a first computer graphics variable defined with respect to an input variable, wherein the input variable is defined over a range of input variable values and wherein the first computer graphics variable includes authored values defined for at least a first subset of the range of input variable values, such that each of the authored values is associated with one of the input variable values within the first subset of the range of input variable values;
generating rendered images for each of the first subset of the range of input variable values, wherein each rendered image includes an active bidirectional association with one of the authored values of the first computer graphics variable and with an input variable interval within the range of input variable values;
generating a presentation including the rendered images and a representation of the input variable intervals;
receiving a modification to one of the authored values of the first computer graphics variable;
identifying the rendered image associated with the modified authored value using the active bidirectional association;
determining a modified input variable interval associated with the identified rendered image based on the modified authored value; and
modifying the presentation such that the representation includes the modified input variable interval.

17. The computer-readable medium of claim 16, wherein:
the input variable includes a time variable defined over at least a range of shot times values;
the first subset of the range of input variable values includes a subset of the range of shot time values associated with the authored values; and
the input variable intervals include shot time intervals at least partially within the range of shot time values.

18. The computer-readable medium of claim 17, wherein the presentation includes a timeline adapted to display at least a portion of the rendered images in association with graphical indicators of their respective shot time intervals.

19. The computer-readable medium of claim 17, wherein the presentation includes an animation view of at least a portion of the computer graphics scene, wherein the animation view is adapted to display each rendered image for a time duration proportional to its associated shot time interval.

20. The computer-readable medium of claim 19, wherein the animation view is adapted to display a background animation composited with the rendered images.

21. The computer-readable medium of claim 16, wherein each of at least a portion of the input variable intervals is associated with a portion of the range of input variable values between adjacent authored values.

22. The computer-readable medium of claim 16, comprising:
receiving a modification to the presentation, wherein the modification selects at least one of the rendered images;
identifying the authored value of the first computer graphics variable associated with the selected rendered image; and
modifying the authored value of the first computer graphics variable based on the modification to the presentation using the active bidirectional association.

23. The computer-readable medium of claim 22, wherein:
the modification includes a modified input variable value associated with the selected rendered image; and
modifying the authored value comprises changing the input variable value associated with the authored value to the modified input variable value using the active bidirectional association.

24. The computer-readable medium of claim 16, wherein determining the modified input variable interval comprises:
selecting the input variable interval associated with the identified rendered image; and
setting a boundary of the selected input variable interval based on the modified authored value to determine the modified input variable interval.

25. The computer-readable medium of claim 16, wherein
the input variable includes a computer graphics variable defined over at least a range of computer graphics variable values; and
the authored values include weight values associated with the first subset of the range of input variable values.

* * * * *